Patented Aug. 22, 1939

2,170,506

UNITED STATES PATENT OFFICE 2,170,506

PROCESS FOR THE PURIFICATION OF NAPHTHENIC ACIDS

Harold G. Reiber, Long Beach, Calif., assignor to Union Oil Company of California, Los Angeles, Calif., a corporation of California No Drawing. Application October 19, 1936, Serial No. 106,367

9 Claims. (Cl. 260—514)

The present invention relates to the purification of naphthentic acids containing impurities of the type of phenols and oils, the present application being a continuation in part of my co-pending application, Serial No. 70,403 for "Process for the purification of naphthenic acids", filed March 23, 1936.

The main object of the present invention is to provide a process by means of which alkali wastes, as obtained for example from a washing of petroleum distillates or fractions with caustic alkali, may be treated to recover therefrom naphthenic acids in a substantially pure state free from impurities such as oils, phenols, carbonaceous and resin-forming substances, etc.

Various methods of treating impure naphthenic acids for the removal of the impurities have been practiced for some time. One of such methods of operation is as follows: The above-mentioned alkali wastes containing the naphthenic acids in the form of their naphthenate soaps usually also contain phenols in the form of phenolates as well as variable amounts of petroleum fractions, asphaltic bodies and other undesirable materials. The impure naphthenic acids obtained from such spent alkali or alkali waste solutions by acidification with a mineral acid will therefore contain these oil-soluble impurities. In order to remove the above-described impurities, the crude naphthenic acids are neutralized by the addition of an alkali of the type of alkali carbonate or hydroxide to a pH value of approximately 9 or 10. The neutralization to the above pH value converts the naphthenic acids into naphthenate soaps but leaves the phenols and the other weakly acidic materials in the acid form. The mixture containing the naphthenate soap solution, oils, phenols, and other acidic materials is then distilled, preferably with the injection of steam and at temperatures sufficiently high to remove said oil, phenols and other volatile materials as the overhead fraction. The still bottom fraction comprises the soaps of the naphthenic acids. These soaps, after cooling and dissolving in water, if desired, are then treated with a mineral acid to recover the naphthenic acids. These acids, being practically insoluble in water, are readily removed as by skimming, and, if desired, may be further purified.

Other methods of purification include the dissolving of crude naphthenate soaps in alcohol diluted with various amounts of water, followed by the extraction of such solutions with a petroleum solvent. A number of alcohols such as methyl, ethyl, isopropyl alcohols, etc. have been proposed or suggested for this purpose.

The above described co-pending application discloses the following novel process for purifying naphthenic acids containing phenols, oils and/or other oil-soluble impurities. According to said process, alkali wastes, which may be but partially spent, used for the washing of various petroleum streams or fractions, are acidified with a mineral acid in order to obtain the impure or crude naphthenic acids. The separated crude naphthenic acids (after removal of the aqueous phase) are then treated with caustic alkali or alkali carbonates to bring them to a pH value of approximately 9 or 10, as described hereinabove, so that all of the naphthenic acids are converted into their soaps without substantially any formation of the phenolates. In view of this neutralization step the previous acidification of the alkali wastes may be only partial because the mixture of the naphthenic acids recovered from the alkali wastes as well as the unaffected naphthenate soaps is then neutralized as described hereinabove. Such partial acidification results in a very considerable economy since there is a saving in the quantity of mineral acid and alkali employed in the two described steps. During the neutralization step the addition of a small excess of alkali, i.e. the neutralization to a pH value of 10 or slightly above, will not necessarily interfere with the operations of the process. However, a larger excess of alkali will result in a conversion of at least a part of the phenols and other weakly acidic materials to the corresponding salts which is undesirable in view of the subsequent treatment. On the other hand, the failure to add sufficient caustic alkali or alkali carbonates to convert all of the naphthenic acids to the corresponding soaps does not interfere with the operations except insofar as it will decrease the yields obtained. This feature, as well as the effect of the first acid treatment of the alkali wastes, are discussed in greater detail hereinbelow.

The mixture of naphthenate soaps and impurities obtained by the controlled neutralization described hereinabove is diluted with water to produce a soap solution containing approximately 12 to 15% of the alkali naphthenate soap. However, in some cases solutions which are diluted to a greater or lesser extent may sometimes be utilized. The aqueous solution of naphthenate soaps containing the phenols and/or oil and the other impurities is then extracted with a suitable solvent capable of dissolving the oil, the free phenols and the other oil-soluble impurities, but which will not dissolve the soaps from the aqueous solution thereof.

As solvents which will dissolve the phenols and oils the above mentioned co-pending application disclosed such materials as cleaners' naphtha, gasoline, liquid propane, liquid butane, pentane, hexane, toluene, xylene or Edeleanu extract obtained from the treatment of light petroleum fractions such as gasoline or naphtha with sulfur dioxide. The use of these low boiling diluents is preferred because they are easily separated from the naphthenic acids, as by distillation, air blowing, etc.

For purposes of brevity, these oil-soluble, water-immiscible solvents having a distillation boiling point range different from or lower than that of the crude acids treated, will be termed hereinbelow as "solvents", "low boiling solvents" or "diluents".

Although the above described process shows that the alkali wastes are first treated with a mineral acid to produce a partial or complete recovery of the crude naphthenic acids therefrom, this step may be frequently omitted. According to this modified process the alkali wastes as recovered from the washing of the petroleum fractions may be directly treated to produce a mixture of a pH value of between 9 and 10, the mixture thus produced being then treated as described hereinabove.

It has been found, however, that this modified procedure does not remove all of the hydrocarbon oils present in the alkali wastes recovered from various petroleum fractions. For example, the naphthenic acids recovered from a kerosene distillate without the above described preliminary step of acidification of the alkali wastes, after proper refining and purification, have an acid number of approximately 250 mg. per gram of KOH instead of the theoretically acid number of 280. On the other hand, the acids produced with the above step of preliminary mineral acid treatment have an acid number of 280 mg. per gram of KOH. Although it is not intended by applicant to be limited to any theory of the case, it is believed that the lower acid number is due to the retention of some of the hydrocarbon oil originally present in the spent alkali wastes. The initial acid treatment apparently breaks down the emulsion of this oil in the alkali wastes, thereby allowing its subsequent removal during the solvent extraction step. Therefore, experiments conducted on alkali wastes from kerosene distillate produced refined naphthenic acids having an acid number of 280 when said alkali wastes were first partially or completely acidified to produce crude naphthenic acids or mixtures of such acids with their soaps, followed by the neutralization of said acids with alkali, and the subsequent treatment as described hereinabove.

The necessity for the rather careful neutralization of the crude naphthenic acids is apparent. Thus, excessive quantities of caustic alkali or alkali carbonate will result in the conversion of the phenols into their corresponding phenolates, thereby preventing the removal of said phenolates during the solvent extraction step with the exception of those phenols which may be produced by the hydrolysis of the phenolate ion. On the other hand, the use of a quantity of alkali insufficient to neutralize all of the naphthenic acids present in the mixture will result in the removal of the unneutralized acids in the oil phase, thus decreasing or lowering the yield. It is, however, obvious that either of the above solutions or mixtures, that is, the one containing the slight excess of alkali or the one containing insufficient alkali, may be successfully extracted. Thus, an extraction with any of the above described solvents of a mixture containing insufficient alkali to neutralize all of the naphthenic acids will result in an appreciable concentration of said naphthenic acids in the oil layer, said naphthenic acids being therefore found in the solvent phase. Such acids may, however, be later recovered from the solvent phase as by a subsequent washing with caustic alkali or alkali carbonate.

As described in the above co-pending application, the aqueous solution of naphthenic soaps containing the impurities of the type of phenols, oils and carbonaceous and resin-forming bodies, is preferably extracted at an elevated temperature with one of the above solvents. This temperature may range from approximately 120° F. to about 180° F., and be preferably in the neighborhood of 160° F. After the extraction, which may be repeated if desired, the solvent containing the impurities is separated from the aqueous solution of the purified naphthenate soaps which latter is then acidified with a mineral acid to liberate the naphthenic acids. After skimming these naphthenic acids, they may then be treated with concentrated sulfuric acids, and/or clay, to improve their color. They may also be distilled under a partial vacuum to produce, as a distillate, a naphthenic acid having a light color.

It has now been discovered that alkali wastes may be treated according to the following process to obtain pure naphthenic acids which are free from phenols, oils, oil-soluble impurities and carbonaceous and resin-forming substances. According to this process, the alkali wastes as obtained from the neutralization of a petroleum fraction containing organic acidity, are first treated with a mineral acid, such as a weak sulfuric acid, to liberate the naphthenic acids present in said alkali wastes. These acids are then skimmed or otherwise removed from the aqueous layer or phase and are then dissolved in a light diluent of the type of low boiling gasoline, or any one of the solvents decribed hereinabove as being equivalents thereof. The solution of the crude naphthenic acids in said solvent is then contacted with a weak alkaline solution, such as a 5% aqueous solution of sodium hydroxide, the quantity of this alkali solution being only sufficient to convert the naphthenic acids into their soaps, but insufficient to affect the phenolic or other weakly acidic materials present. It has been found that the addition of the alkaline solution to the phenolphthalein end point, i. e. a pH value of approximately 9 or 10, will cause said conversion of the naphthenic acids without any effect on the phenolic and other weakly acidic materials. The mixture thus produced is then allowed to stand to cause phase separation, the lower phase comprising the aqueous solution of the semi-refined naphthenate soaps, while the upper phase consists of the solvent containing the phenolic and similar materials as well as the mineral oil fractions originally dissolved or emulsified in the alkali wastes. After separation of the phases the aqueous solution of the naphthenate soaps is then treated with a mineral acid, such as sulfuric acid, to liberate the naphthenic acids contained therein, these de-oiled and de-phenolated acids rising to the surface of the aqueous phase. The acids may then be removed as by skimming, and may be further purified, if desired, as by distillation. If desired, the naphthenate soap solution, prior to acidification, may be treated, as by air blowing, to remove any solvent remaining therein.

In the above described operations the importance of the careful control or adjustment of the amount of alkali employed for the neutralization of the crude naphthenic acids recovered from the alkali wastes is reflected in the color, odor and acid number of the refined material produced. This is especially so in the cases where the amount of phenolic and like impurities present in the crude naphthenic acids is very appreciable. In such cases it is advisable to use such quantities of the alkali that a small amount of the naphthenic acids will remain in the solvent solution, thus assuring that all of the impurities remain in said solvent solution. For example, it has been found that crude naphthenic acids, having a theoretical acid number of 250 mg. KOH per gram when treated according to the above described process and under such conditions that approximately 1 to 3% of the naphthenic acids remain in the solvent solution, after a neutralization with the alkali, resulted in a refined naphthenic acid of a bland odor, of a somewhat improved acid number and a color of approximately 6½ N. P. A. as compared with a color of 8 N. P. A. of the naphthenic acids produced by a method in which complete saponification of the naphthenic acids is used. The residual acids remaining in the solvent solution were found to be black in color, strongly phenolic in odor and having a relatively low acid number. It is thus obvious that the above procedure of employing an amount of caustic or other alkali somewhat smaller than that required theoretically to convert all of the naphthenic acids into their soaps, in some cases, and particularly in those where the crude naphthenic acids contain relatively large quantities of phenolic materials and other impurities, results in refined naphthenic acids which are improved considerably in color, odor and acid number.

The above described process of refining naphthenic acids may be modified to include the step of removing the carbonaceous and color-producing bodies present in the crude or semi-refined naphthenic acids. According to the present process it was found that this may be realized by treating the crude acids with a mineral acid, such as sulfuric or phosphoric acid in the presence of a diluent of the type described above. In this modification of the process, the crude naphthenic acids are obtained from the alkali wastes by the ordinary method of acidification with a mineral acid, such as a weak solution of sulfuric acid. The crude naphthenic acids removed from the aqueous phase containing the alkali sulfates are then dissolved or diluted in liquid propane, liquid butane, pentane, naphtha, gasoline, or any other similar low-boiling solvent which has a boiling point or boiling point range different from and preferably lower than that of the crude naphthenic acids and of the impurities contained therein. The naphthenic acid solution thus produced may then be allowed to stand to cause the separation of some of the water as well as of a part of the suspended carbonaceous materials. The decanted naphthenic acid solution should then be preferably preliminarily dried. This may be carried out by treating the solution with small quantities of strong sulfuric acid, which is known to be a drying agent. It has been found for example, that 1 to 4 lbs. of 80% sulfuric acid per barrel of naphthenic acids present in the solution cause an efficient drying of the solution. However, in some cases it may be necessary to repeat the drying treatment several times to remove the occluded water. The dehydrated or dried solution of naphthenic acids in solvent is then treated with further quantities of sulfuric acid to remove the color-producing bodies contained in the naphthenic acids. At this point it is sometimes desirable to further dilute the solution so that the concentration of the naphthenic acids in the hydrocarbon solvent will be smaller. Experiments have shown that approximately 30 to about 100 lbs. of 80% sulfuric acid should be employed for this treatment per barrel of the naphthenic acids in solution. The quantity of the sulfuric acid obviously will depend on the character and quantity of the undesirable gummy, resinous, color-producing and/or carbonaceous materials to be removed from the crude acids. Although the above example showed the use of 80% sulfuric acid it has been found that the strength may advantageous vary from 35% to as high as 98% $H_2SO_4$. It has been further found that the treatment should preferably be carried out at temperatures ranging from 70° F. to 90° F. The reaction of the sulfuric acid on the above undesirable materials produces sludge, which is then removed, as by decanting. The solution of the purified naphthenic acids is then treated with an aqueous alkali solution such as a 5% solution of sodium hydroxide to convert the naphthenic acids into its naphthenates. If the naphthenic acids have not been further diluted prior to the aforementioned acid treatment, it is frequently desirable, and even sometimes necessary, to dilute the acid treated naphthenic acids prior to the saponification step. Such dilution, preferably to about 5 to 10%, aids separation of the soap solution from the solvent phases. The naphthenate soaps may then be further treated as desired hereinabove.

Preferably, the naphthenic acids dissolved in the low boiling point diluent, after the above described sulfuric acid treatment to remove the carbonaceous materials, are treated with a quantity of alkali such as the aforementioned 5% solution of caustic soda only sufficient to neutralize the naphthenic acids but insufficient to attack the phenolic materials. In other words, the alkali solution is added until the pH value of the solution is substantially between 9 and 10. After allowing the above produced mixture to stand for a certain period of time, two phases are obtained. The lower phase consists of the aqueous solution of the alkali naphthenates while the upper oily phase comprises the oils and phenols in solution in the hydrocarbon solvent. After separation of the phases the aqueous phase is then treated with a quantity of sulfuric or other mineral acid to liberate the naphthenic acids contained therein. The mixture is then allowed to settle and separate into two phases, the purified naphthenic acids rising to the top and being skimmed off and distilled if desired for purposes of further improvement of color as described previously.

As a specific practical example of the realization of the above described process of refining naphthenic acids, 202 barrels of spent alkali obtained from the neutralization of a gas-oil distillate of about 30° A. P. I. with a caustic solution, were treated as follows: The above spent alkali, containing approximately 24% by volume, of crude acids, and having an acid number of approximately 170 mg. KOH per gram, was acidified with 4280 pounds of 80% sulfuric acid, thus causing the conversion of the naphthenate soaps into their acids. After allowing the mixture to stand for about six hours, the water phase was separated from the crude naphthenic acids. The acids were then diluted with 300 barrels of a gasoline raffinate, or a similar diluent. The diluted solution was then treated thrice with 100 pound batches each of 80% sulfuric acid, the sludge, containing the water and carbonaceous materials, being removed after each treatment. Although not essential, it was found that agitation with air for a few minutes followed by settling for about one hour, produced the desired result. The dewatered solution of naphthenic acids was then thoroughly commingled with approximately 2000 pounds of sulfuric acid. After a settling period of 5 to 6 hours, the sludge was removed, and the semi-refined naphthenic acid solution was further diluted with about 330 barrels of the above described or another diluent. Approximately 350 barrels of sodium hydroxide solution was then added to bring the pH value of the mixture to about a value of 9, so as to convert the naphthenic acids into their soaps without any saponification of the phenols present. The mixture was then allowed to stand, and the diluted solution of oils and phenols was separated from the aqueous solution of the purified naphthenate soaps. The 412 barrels of said aqueous solution thus obtained was then heated to about 160° F. and was then acidified with enough sulfuric acid to cause the re-conversion of the soaps into the naphthenic acids. After standing for six to eight hours, the mixture separated into phases, and the purified naphthenic acids were removed from the water phase. Thirty-six barrels of naphthenic acids, having an acid number of 200 mg. KOH per gram and a color of 6 N. P. A., were thus produced.

It is to be noted that the acids thus produced have a somewhat lower acid number than that theoretically calculated. This is believed to be caused by the presence of a small quantity of the low-boiling solvent which may be easily removed by vacuum distillation, or, for example, by an air blowing of the soap solution prior to the final acidification. However, it is to be noted that the presence of this light or low boiling solvent is not objectionable when the acids are to be used for the manufacture of paint driers.

As previously pointed out, the treatment of petroleum oils, their fractions or distillates, with caustic solution or with alkali carbonates produces alkali wastes which normally contain soaps of naphthenic acids as well as salts of phenols. It was also pointed out that after the above described dilution with a hydrocarbon solvent with or without the acid treatment to remove the carbonaceous materials, it is necessary to carefully adjust the pH value of the mixture so that only the naphthenic acids are converted into their soaps leaving the phenolic and other weakly acidic materials in their free form.

It has been found, however, that if the original caustic alkali or alkali carbonate solution employed for the neutralization of petroleum oils is used for such neutralization until the causticity of said alkali solution is substantially zero, that the alkali wastes thus produced contain substantially no phenolates but comprise an aqueous solution of naphthenate soaps containing emulsified or occluded mineral oils. It is obvious that the crude naphthenic acids produced from such alkali wastes having substantially no causticity contain substantially no phenols and that therefore the above described careful neutralization of said crude naphthenic acids is unnecessary, since the alkali solution added at this point will not affect the neutral mineral oils contained in the crude acids.

It is therefore a still further object of the invention to obtain alkali wastes containing substantially no phenolic bodies by employing the alkali solution used for the neutralization of the petroleum oils, their fractions or distillates until said alkali solution has substantially no causticity.

It is to be understood that many changes could be made in the above described processes, and that many widely different embodiments of this invention could be made without departing from the scope thereof, and it is intended that all matter contained in the above description shall be interpreted as illustrative and limited only by the appended claims.

I claim:

1. In the process of purifying crude naphthenic acids containing phenols and oil wherein said acids are diluted with a low-boiling water-immiscible solvent, treated with sulphuric acid and recovered by extraction in the form of naphthenate soaps from the solvent containing dissolved oil and phenols by the addition of alkali to the treated naphthenic acids, the step of controlling the amount of alkali added to the treated naphthenic acids to convert the naphthenic acids into soaps, said amount of alkali added being insufficient in quantity to convert the phenols present in the treated acids into phenolates.

2. In a process according to claim 1 wherein the acid treated semi-refined naphthenic acid solution is saponified by the addition of the alkali until said solution has a pH value of between about 9 and 10.

3. In the process of purifying crude naphthenic acids containing phenols and oil wherein the crude naphthenic acids are converted into soaps by means of an alkali, diluted with water and extracted with a low-boiling water immiscible solvent to remove the phenols and oils from the naphthenate soaps the step of controlling the quantity of alkali employed in an amount sufficient to convert the naphthenic acids into soaps but insufficient in amount to convert the phenols present in the crude naphthenic acids into phenolates.

4. A process according to claim 3 in which soap diluted with water contains 12 to 15% soap.

5. A process for the recovery and purification of naphthenic acids from the spent caustic solutions containing naphthenate soaps, phenolates, oil, and other carbonaceous and resin-forming impurities, which comprises adding sufficient acid to the spent caustic solution to liberate both the naphthenic acids and the phenols, separating the crude naphthenic acids, phenols, oils and impurities from the aqueous phase, diluting said separated crude naphthenic acid phase with an oil-soluble, water-immiscible solvent, treating said solution thus produced with sulfuric acid to remove the carbonaceous and resin-forming impurities, adding sufficient caustic alkali to the solution thus refined to convert the naphthenic acids into naphthenates but to leave the phenols in an uncombined state, separating the aqueous solution of the naphthenates from the solution of oils and phenols in the solvent, and acidifying the naphthenate soap solution to liberate therefrom the purified naphthenic acids.

6. In a process according to claim 5 wherein the diluted solution of the crude naphthenic acids, phenols and oils is dehydrated prior to the acid treatment step.

7. In a process according to claim 5, wherein the diluted solution of crude naphthenic acids, phenols and oils in the solvent, prior to the acid treatment step is treated with relatively small quantities of sulfuric acid to remove the water occluded therein.

8. A process for the recovery and purification of naphthenic acids contained in petroleum fractions, which comprises washing said fractions with an alkali solution to recover therefrom the naphthenic acids and phenols, separating said spent alkali solution containing the naphthenic acid soaps, phenolates, oil and carbonaceous and resin-forming impurities, adding sufficient acid to said spent caustic solution to liberate both the naphthenic acids and phenols, separating said liberated solution from the aqueous phase, diluting said liberated phase with a low boiling oil-soluble, water-immiscible solvent, removing the water in said solution, treating said diluted solution with a mineral acid to remove therefrom the carbonaceous and resin-forming impurities, further diluting the solution with a low boiling oil-soluble, water-immiscible solvent, adding sufficient caustic alkali to the solution thus treated to convert the naphthenic acids into their soaps but to leave the phenols in an uncombined state, separating the aqueous solution of the naphthenate soaps thus produced from the solvent phase containing the phenols and oils, adding sufficient mineral acid to the aqueous phase to liberate the naphthenic acids, and separating the purified naphthenic acids thus produced.

9. In a process according to claim 8 wherein the alkali is added to the acid treated diluted solution in a quantity sufficient to adjust a pH value of said solution to between about 9 and 10.

HAROLD G. REIBER.